United States Patent Office 3,307,425
Patented Mar. 7, 1967

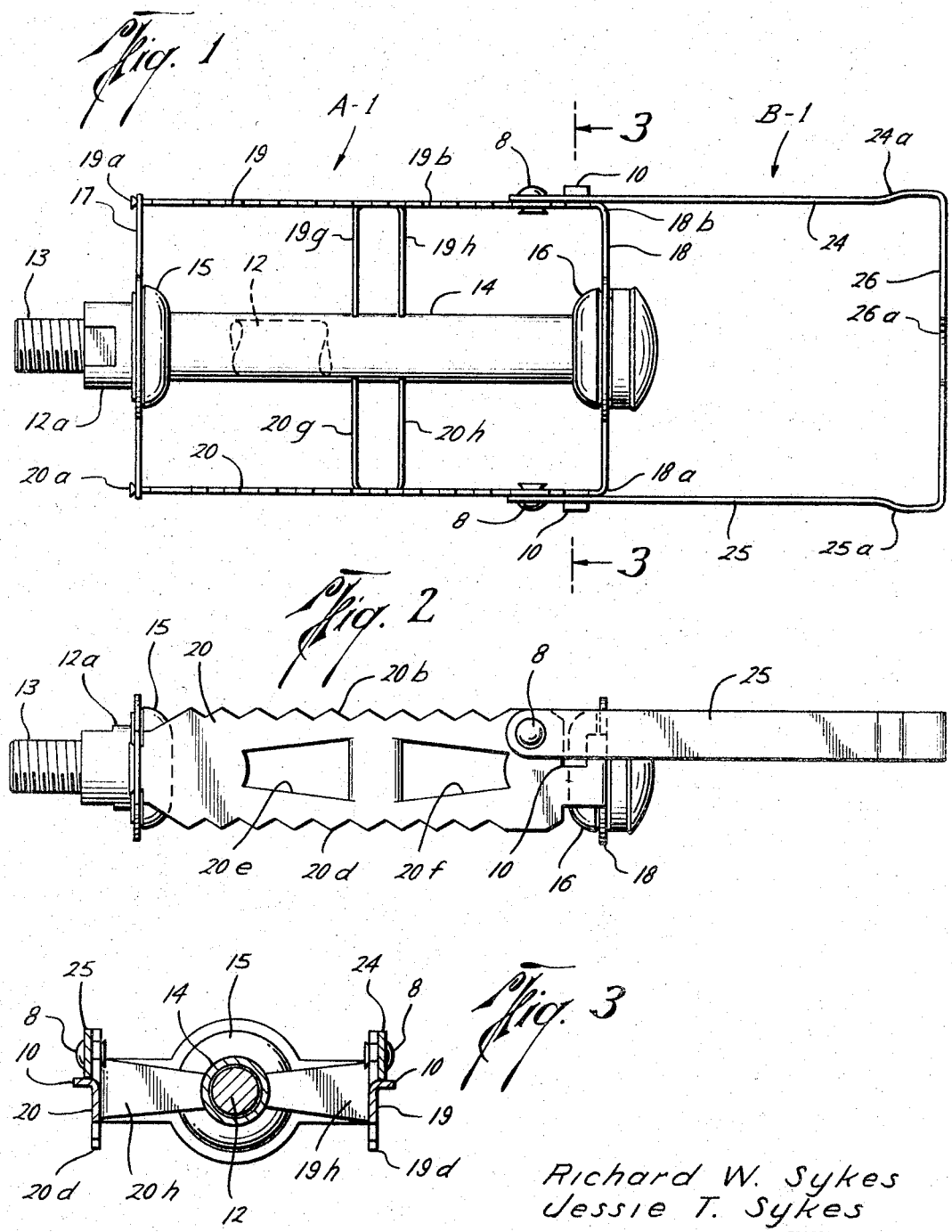

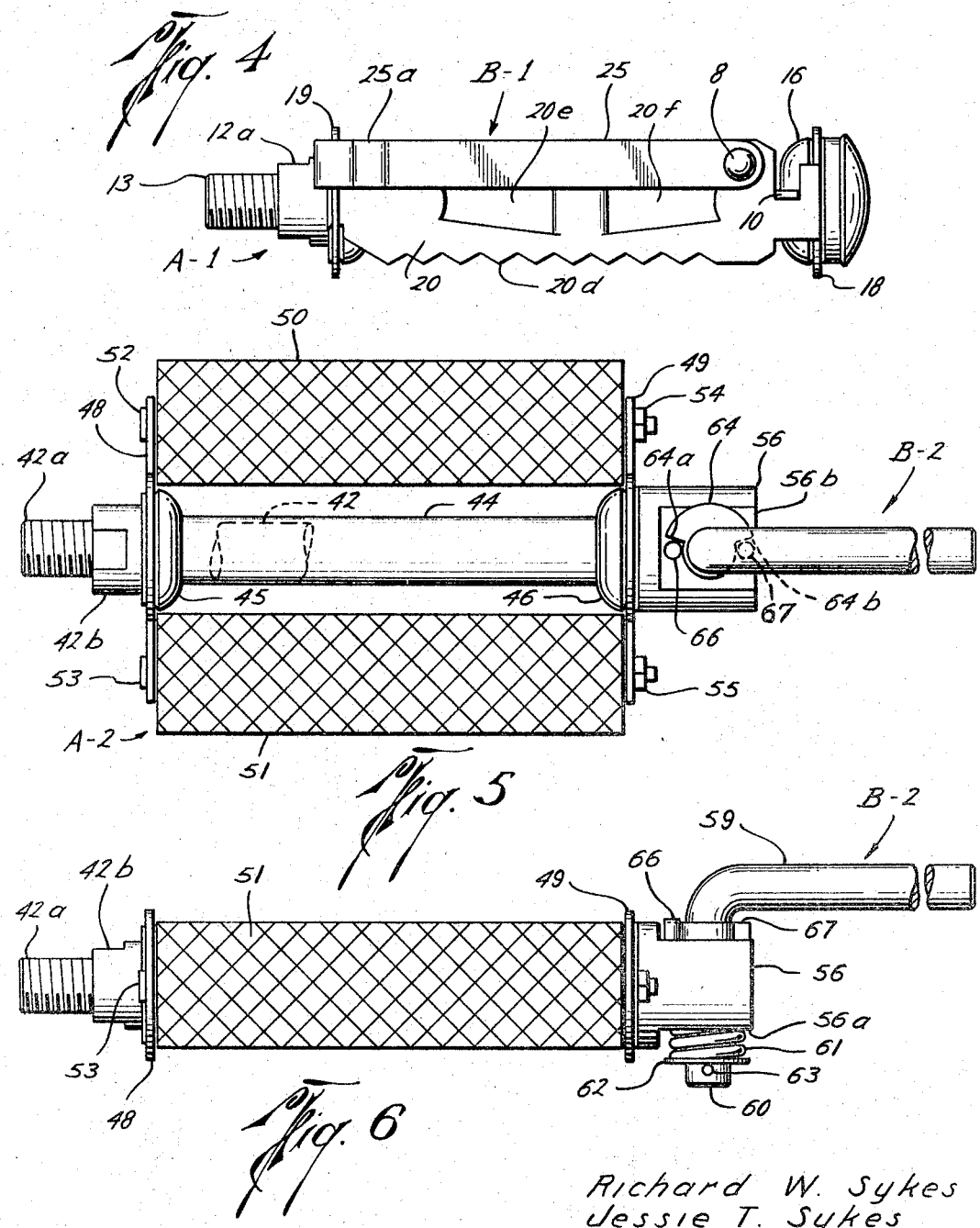

3,307,425
EXTENDIBLE BICYCLE PEDAL
Richard W. Sykes and Jessie T. Sykes, Houma, La.
(Both of 1244B Flatter Lane, Lake Charles, La. 70601)
Filed June 18, 1964, Ser. No. 376,003
6 Claims. (Cl. 74—594.7)

This invention relates to new and useful improvements in bicycle pedals and more particularly to bicycle pedals which are extendible to receive the feet of two bicycle riders thereon for pumping and yet are retractable to an unextended position which does not interfere with the use of the pedals by one bicycle rider.

Bicycling for pleasure and for other reasons is increasing in popularity, most especially among adults. This is particularly common for married couples seeking light exercise and relaxation and a chance to converse freely without the interference of the demanding activities of the day. Bicycles may be equipped with luggage carriers, buddy seats behind the rider's seat or with relatively long seats accommodating two bicycle riders on the bicycle. While it is difficult for one person to pump a bicycle burdened with the weight of an additional rider, the device of this invention permits both riders to apply torque to the crank through the pedals of the bicycle to share the burden of moving the bicycle.

Therefore, an object of this invention is to provide a new and improved extendible bicycle pedal for receiving two feet on the pedal to pump the bicycle.

A principal object of this invention is to provide a new and improved folding extension for a bicycle pedal which folds to a retracted position which does not interfere with the use of the pedal by one rider in the conventional manner.

An important object of this invention is to provide a new and improved bicycle pedal having an extendible portion of sufficient length to allow the feet of two bicycle riders to pedal the bike, said portion having structural rigidity for transferring the torque from the foot of the second rider to the bicycle crank.

A further object of this invention is to provide a new and improved bicycle pedal having an extendible portion which is locked in an extended position parallel to the bicycle pedal against further rotation.

Yet another object of this invention is to provide a new and improved bicycle pedal having a pair of projections which lock an extendible foot support in position for receiving the foot of a second rider on the bicycle to aid in pumping the bicycle.

One object of this invention is to provide a new and improved bicycle pedal which converts the conventional one rider bicycle into a bicycle adapted to be pumped by two riders.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a plan view of a racing bicycle pedal having an extended portion for receiving the second foot of a bicycle rider;

FIG. 2 is a side view of the bicycle pedal with extendible portion illustrated in FIG. 1;

FIG. 3 is a sectional view taken along the line 3—3 of FIG. 1;

FIG. 4 is a side view similar to FIG. 2 in which the extendible portion is folded to a retracted position permitting use of the pedal in the conventional manner;

FIG. 5 is a plan view of an embodiment of the invention adapted for use with a conventional bicycle pedal which embodiment is adapted to accommodate the feet of two bicycle riders; and FIG. 6 is a side view of the device illustrated in FIG. 6.

Considering the invention broadly, a racing bicycle pedal A-1 is illustrated in FIGS. 1-4 as having a foot support member B-1 connected near the outer end of the pedal by a pivotal attaching means near the outer terminus of the pedal 8. The foot support member is rotatable about the pivotal means 8 to the extended position wherein the stop means indicated generally at 10 serves as means for securing the foot support member B-1 in an extended position for receiving the foot of a bicycle rider thereon. The foot support member B-1 is adapted to be retracted to a folded position wherein means for securing the member in the retracted position lock the foot support member for storage when not in use and out of the way of the bicycle rider.

Considering the invention more in detail, the bicycle pedal A-1 includes a longitudinally extending shaft 12 which is threaded at one end at 13 for connection with the crank of a bicycle in a conventional manner and has an integral bolt head 12a formed with wrench flats on the head. The shaft is enclosed in a rotating sleeve 14 which is enlarged at 15 and 16 to define housings containing ball bearing assemblies (not shown). Each of the housings 15 and 16 is connected to perpendicularly extending support brackets 17 and 18, respectively, and the support brackets 17 and 18 support a pair of parallel cleated foot braces 19 and 20. In the preferred embodiment the support brace 18 which is opposite the portion connected to the bicycle crank is bent at 18a to define the cleated foot brace 20 and one end of the brace 20 is inserted through a narrow slot in the bracket 17 and flared at 20a. Likewise, the parallel member 19 is connected to the support bracket 18 at 18b and one end of the brace is inserted at its tip through a narrow slot in the support bracket 17, which tip is flared at 19a. The cleated foot braces 19 and 20 are formed with irregular surfaces as exemplified in FIG. 2 by the "toothed" edges on the opposite sides of the member 20 having the preferred form of identical projections 20b and 20d.

The cleated foot braces 19 and 20 are punched with lightening holes 20e and 20f shown in FIG. 2 and the severed material is bent inwardly toward the rotatable sleeve 14 to form a pair of centrally located support members 20g and 20h wihch abut the outer surface of the rotatable sleeve 14. The cleated foot brace 19 is also lightened to include a pair of centrally located members 19g and 19h which abut the rotatable sleeve 14 opposite the members 20g and 20h.

The foot support member B-1 is a U-shaped member having a pair of parallel, spaced-apart arms 24 and 25 which are connected together by a cross member 26. Each of the arms 24 and 25 is connected to the pivotal means 8 so that the foot support member B-1 is adapted to rotate about the pivots 8 which are connected through holes in the arms 24 and 25 and openings in the cleated foot braces 19 and 20; the pivotal means are rivets or other suitable means for assembling the extendible bicycle pedal of this invention. The arms of the foot support member are bent outwardly at 24a and 25a to allow clearance for the perpendicularly extending support bracket 17 when the foot support member B-1 is folded to the retracted position illustrated in FIG. 4. The cross member 26 is contoured along the edge placed nearer the rotating sleeve and integral bolt head 12a formed on the shaft which permits connection of the pedal A-1 to the crank by means of a wrench applied to the bolt head 12a. The cross member 26 is notched at 26a and the notch 26a is somewhat semicircular to fit against the bolt head 12a.

The foot support member B-1 is locked in the extended position by contact of the arms 24 and 25 against the pair of lock tabs 10 which extend outwardly of the cleated foot braces 19 and 20 illustrated in the drawings. Considering FIG. 3 in particular, the lock tabs 10 are relatively small projections bent outwardly from the cleated foot braces 19 and 20 which are positioned relative to the pivots 8 for securing the foot support member B-1 in the extended position.

FIG. 3 additionally illustrates the support supplied by the centrally located and inwardly extending members 19h and 20h which are defined by the shape of the lightening holes punched in the cleated foot braces 19 and 20.

FIG. 4 illustrates the foot support member B-1 folded to the retracted position with slight friction between the support arms 24 and 25 bearing against the cleated foot braces 19 and 20 to aid in securing the cross member 26 against the integral bolt head 12a when the bicycle rider desires to use the pedal A-1 in the conventional manner. The foot of the bicycle rider may be rested on the upper edge of the pedal A-1 as viewed in FIG. 4 or the pedal may be rotated about the shaft 12 so that the foot of the bicycle rider rests on the opposite edges of the cleated foot braces 19 and 20.

A conventional bicycle pedal A-2 and foot support member B-2 is illustrated as a second embodiment of the invention in FIGS. 5 and 6. The bicycle pedal A-2 is assembled about a longitudinally extending shaft 42 which is threaded at 42a and includes an integral bolt head 42b which provides a gripping surface for a wrench or other hand tool. The shaft 42 is surrounded by a rotatable sleeve 44 which is flared at 45 and 46 to form housings containing ball bearing assemblies to reduce the friction of rotation of the sleeve 44 about the shaft 42. The bearing housing 45 which is located nearer the threaded portion 42a is connected to a perpendicularly extending support bracket 48 and the other bearing housing 46 also carries a perpendicular support bracket 49 which is in spaced alignment with the support bracket 48. Resilient means such as grippered, rubber foot supports 50 and 51 are secured between the perpendicularly extending support brackets 48 and 49 by a pair of longitudinally extending bolts 52 and 53 having nuts 54 and 55, respectively, threaded thereon as illustrated in the drawings. The foot support gripping means provides a tractive surface on either side of the bicycle pedal A-2 for receiving and supporting the foot of a bicycle rider to pump the bicycle. The foot of a second bicycle rider is received on the foot support member B-2 which is extended beyond the bicycle pedal A-2 when desired.

The foot support member indicated generally at B-2 includes a mounting bracket 56 with one of a pair of spaced-apart faces 56a illustrated on the lower side of the bracket in FIG. 6 and the upper face 56b is positioned opposite the face 56a. The member B-2 includes a horizontally extending foot support 59 which carries a projecting shaft 60 extending downwardly through a hole in the mounting bracket 56. A coil spring 61 or other suitable resilient means is positioned about the lower portion of the projecting shaft 60 and a washer 62 is contacted against the coil spring 61 by a cotter pin or other suitable locking projection 63 carried on the downwardly extending projecting shaft 60 to confine the resilient force of the spring 61 and urge the projecting shaft 60 downwardly in the hole in the mounting bracket.

An annular shoulder or collar 64 terminating in two end faces 64a and 64b provides a means for locking the foot support member B-2 in the extended or retracted position. A pair of locking surfaces having the preferred construction of cylindrical lock pins 66 and 67 are positioned on the upper face 56b of the mounting bracket 56 and are deployed relative the cam means 64 to cooperate therewith for locking the foot support member B-2 in either the extended or retracted position. The locking pins 66 and 67 project sufficiently above the face 56b to abut the end faces 64a and 64b of the cam means 64 to thereby restrain movement of the cam means 64 but the lock pins are preferably short enough to allow clearance for the collar 64 as will be described in greater detail hereinafter.

Considering the extendible brake pedals of this invention in operation, the racing bicycle pedal A-1 is attached to the crank of a bicycle in the conventional manner of threading the threaded portion 13 carried on the shaft 12 into the opening on the crank which is expedited by use of a wrench on the integral bolt head 12a. The member is attached and the brake pedal is thereafter ready for use in the conventional manner. Such use is usually contemplated by the placement of one foot on the bicycle pedal and it may be appreciated that the rider's foot may be rested on either the upper or lower surface of the pedal as illustrated in FIG. 4. When it is desired to transport an additional rider on the bicycle, pumping of the bicycle by the second rider is enabled by extending the foot support member B-1 to the position illustrated in FIGS. 1 and 2. The foot support member B-1 is grasped and pulled from the retracted position illustrated in FIG. 4 and is rotated about the pivot means 8 towards the extended position and contacted against the lock tab means 10 which extend perpendicularly outwardly of the cleated foot braces 19 and 20. The tabs 10 limit rotation of the foot support member B-1 and also receive the thrust of the foot of the second bicycle rider when in use. The bicycle pedal A-1 functions in the contemplated manner wherein the ball bearing assemblies are secured within the shaft 14 to reduce friction between the rotating shaft 12 which is carried with the crank of the bicycle and the bicycle pedal which faces upwardly and does not rotate when the feet of the bicycle riders are rested on the cleated foot braces 18 and 19 and the arms 24 and 25 of the support member B-1.

The alternative embodiment of this invention illustrated in FIGS. 5 and 6 is likewise attached to the crank of the bicycle by connecting the threaded portion 42a of the shaft 42 into the crank utilizing the wrench flats on the integral bolt head 42b. The foot support member B-2 is carried in the retracted position wherein the foot support 59 extends parallel to and immediately adjacent the rotatable sleeve 44 when not in use. It may be appreciated that the bicycle rider may place his foot on either side of the bicycle pedal A-2 when the foot support 59 is retracted but greater comfort may be achieved by using the nether side of the pedal as illustrated in the drawings 5 and 6. Movement of the foot support 59 to the extended position illustrated in the drawings is achieved by grasping the foot support 59 and pulling axially along the projecting shaft 60 to compress the coil spring 61 between the face 56a of the mounting bracket 56 and the washer 62. The collar 65 is lifted above the face 56b of the mounting bracket 56 and sufficient clearance is achieved over the lock pins 66 and 67 to permit rotation of the means 64 about the axis of the projecting shaft 60 without abutting interference from the lock pins. The foot support 59 is rotated to the extended position and is released whereupon the lock pins 66 and 67 co-act with the end faces 64a and 64b to secure the collar 64 against further rotation. As shown in the plan view of FIG. 5, the collar 64 extends circumferentially of the projecting cylindrical shaft a distance sufficient to lock the foot support 59 in the extended position and it may also be appreciated that the rotation of the lock means 180 degrees about the axis of the projecting shaft 60 with a similar lifting action repositions the collar 64 relative to the lock pins 66 and 67 with the faces 64a and 64b limited in movement by the lock pins. In the extended position, the foot support member B-2 is adapted to receive the foot of the second bicycle rider thereon to aid in pumping the bicycle in a manner similar to that for the first mentioned embodiment of this invention.

The foregoing disclosure and description of the inventio is illustrative and explanatory thereof and various changes in the size, shape and materials, as well as in the details of the illustrated construction, may be made within the scope of the appended claims without departing from the spirit of the invention.

What is claimed is:

1. An extendible bicycle pedal comprising:
   (a) a bicycle pedal including
      (1) a threaded shaft adapted to be connected to a bicycle crank;
      (2) a rotatable sleeve positioned about a portion of the shaft;
      (3) support brackets extending perpendicularly outwardly of the rotatable sleeve;
      (4) a pair of foot supports carried by the support brackets in a plane including the rotatable sleeve;
      (5) the surfaces of the foot supports exposed to contact by the foot of a rider having gripping means thereon said gripping means of the pair of foot supports being parallel and in the same plane;
   (b) pivot means carried on the bicycle pedal at the outer end of the pedal;
   (c) a foot support member connected to the pivot means and rotatable from a retracted position to an extended position for receiving a foot thereon; and
   (d) means for securing the foot support member in the extended position parallel to the bicycle pedal and in line therewith to receive the foot thereon.

2. An extendible racing bicycle pedal comprising:
   (a) a racing bicycle pedal;
   (b) a generally U-shaped member;
   (c) pivot means connecting the ends of the U-shaped member to the outer end of the racing bicycle pedal;
   (d) stop tab means carried on the bicycle pedal in proximity of the pivot means for engaging the U-shaped member to limit rotation of the U-shaped member; and
   (e) said U-shaped member rotating to an extended position for receiving the foot of a bicycle rider thereon and rotating to a retracted position beneath and parallel to the bicycle pedal.

3. An extendible bicycle pedal comprising:
   (a) a bicycle pedal;
   (b) a foot support of sufficient length for receiving the foot of a bicycle rider thereon;
   (c) a mounting bracket having a hole perpendicular to the longitudinal shaft of the bicycle pedal, which bracket is connected to the outer end of the pedal;
   (d) a projecting shaft carried on the foot support positioned in the hole of the bracket;
   (e) face means positioned on the projecting shaft;
   (f) locking means carried on the mounting bracket for limiting the range of movements of the face means carried on the projecting shaft; and
   (g) resilient means tending to maintain the face means in locking engagement with the mounting bracket.

4. An extendible bicycle pedal comprising:
   (a) a shaft threaded at one end;
   (b) a sleeve positioned about the shaft;
   (c) a pair of ball bearings assemblies positioned about the shaft;
   (d) bearing housings formed in the sleeve for receiving the bearing assemblies in a friction reducing relationship between the shaft and the sleeve;
   (e) a support bracket extending perpendicularly outwardly from the outer end of the sleeve;
   (f) a mounting bracket extending outwardly from the support bracket and having an opening therein;
   (g) a foot support carried by the mounting bracket;
   (h) said foot support having a projecting shaft engaging the opening in the mounting bracket;
   (i) a collar extending partially about the projecting shaft and terminating in two end faces;
   (j) a projecting pin extending from the mounting bracket and contacted by the collar;
   (k) resilient means including a spring coiled about the projecting shaft urging the collar carried on the shaft into contact with the mounting bracket;
   (l) said pin being located relative the end faces of the collar to limit the foot support in a retracted position adjacent the rotatable sleeve;
   (m) said collar extending sufficiently about the projecting shaft to lock the foot support in an extended position for receiving a foot thereon; and
   (n) said collar and said pin being positioned relative to one another to permit rotation of the projecting shaft on slight axial movement thereof against the resilient means.

5. An extendible racing bicycle pedal comprising:
   (a) a racing bicycle pedal including a pair of parallel cleated foot races;
   (b) a pair of rotatable pivots attached to the cleated foot braces near the outer end of the pedal;
   (c) a foot support member including two arms and a cross member;
   (d) said arms being connected to the rotatable pivots;
   (e) said cross member limiting rotation of the foot support member to a retracted position; and
   (f) means for engaging the arms of the foot support member to limit rotation about the pivot means to an extended position parallel to the bicycle pedal for receiving the foot of a bicycle rider thereon.

6. An extendible bicycle pedal comprising:
   (a) a bicycle pedal;
   (b) a foot support member;
   (c) means pivotally attaching the foot support member to the bicycle pedal;
   (d) means for limiting rotation of said support member to a position parallel to said bicycle pedal; and
   (e) said pivotal attaching means being located relative said bicycle pedal to also position said support member in line with said bicycle pedal.

References Cited by the Examiner

UNITED STATES PATENTS 634,296  10/1899  Hart _____ 280—294
2,715,342  8/1955  Ridgway _____ 74—594.7

MILTON KAUFMAN, *Primary Examiner.*